April 23, 1929.   L. W. BONNEY   1,710,670
AEROPLANE
Filed Nov. 9, 1925   8 Sheets-Sheet 5

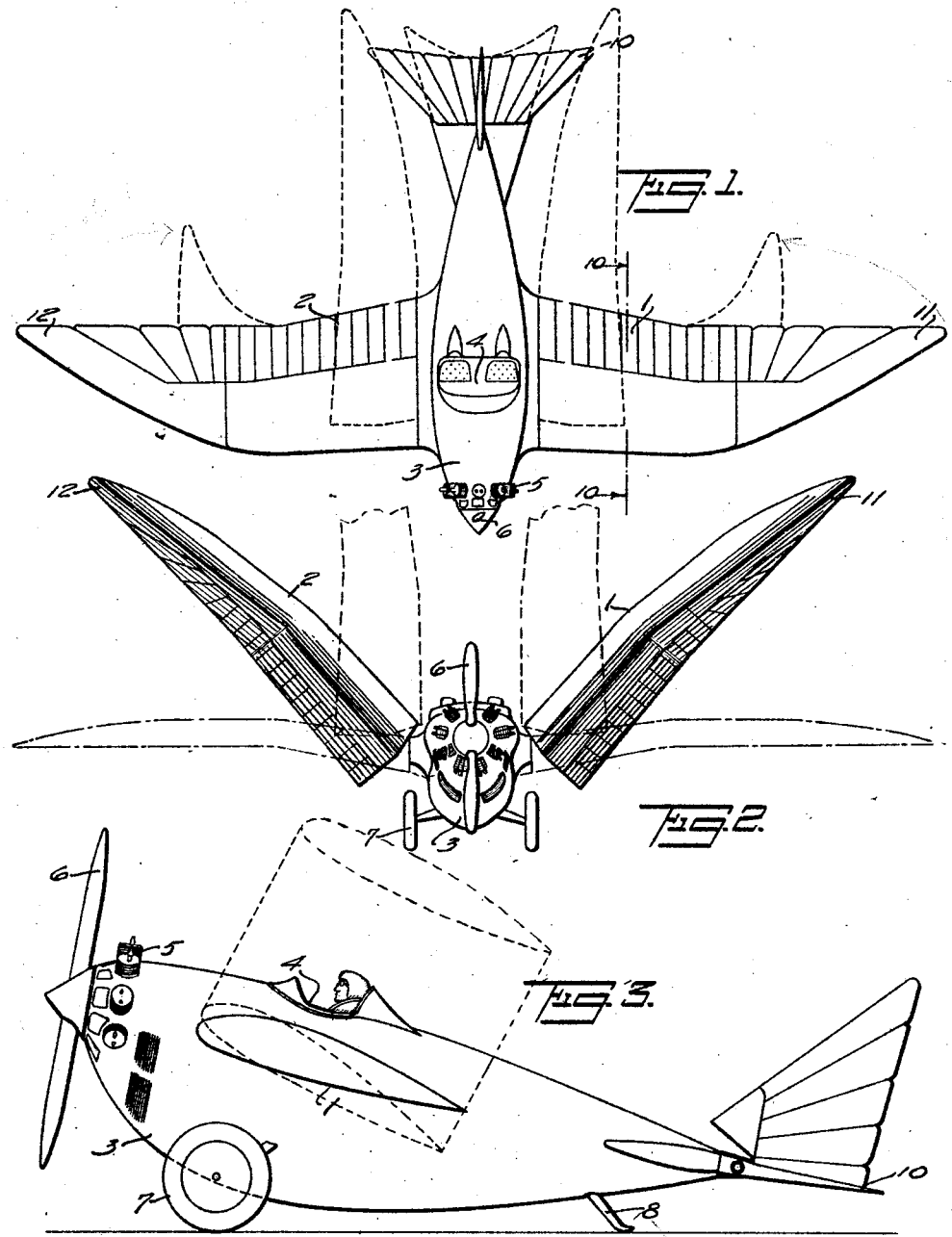

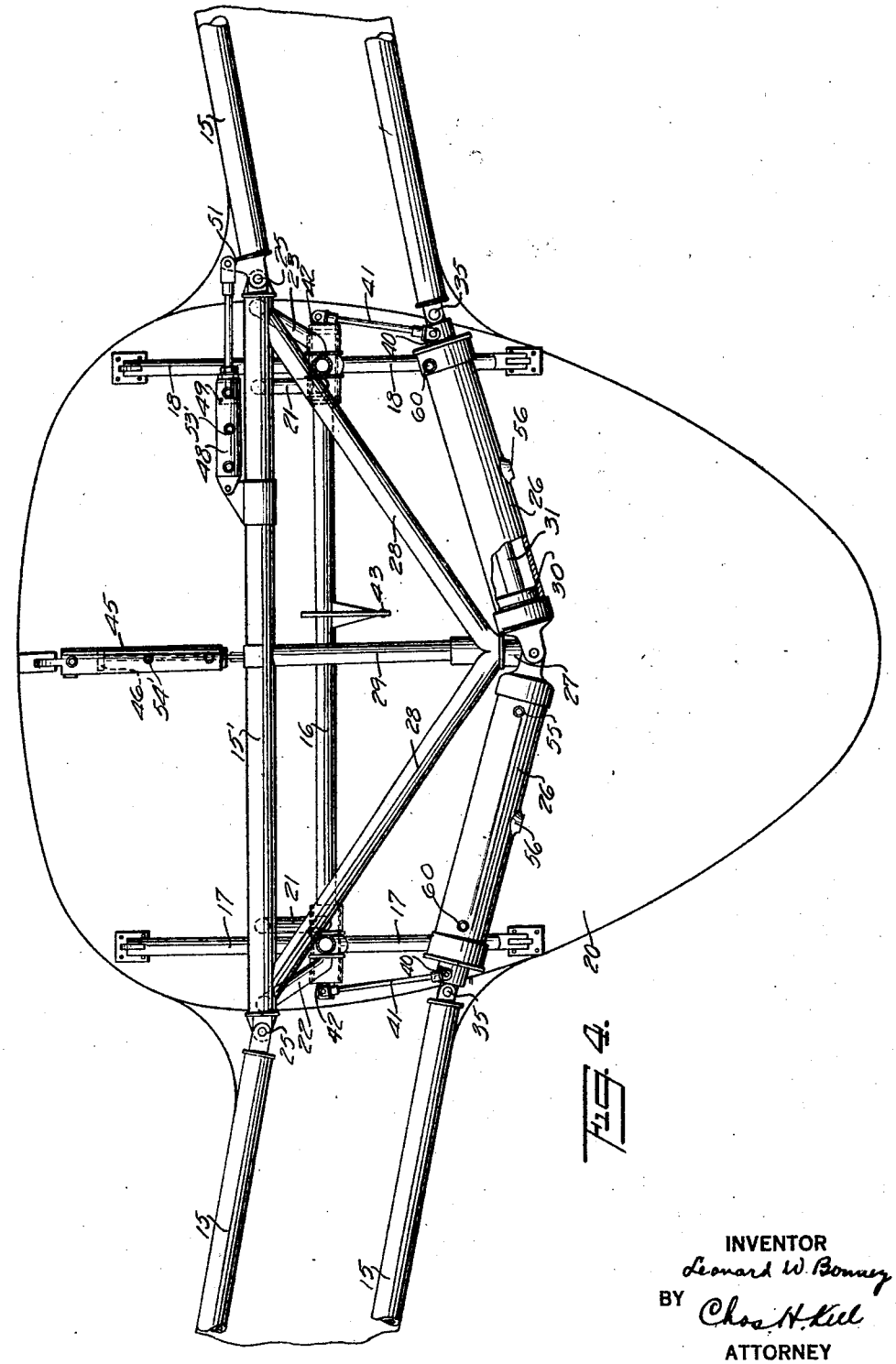

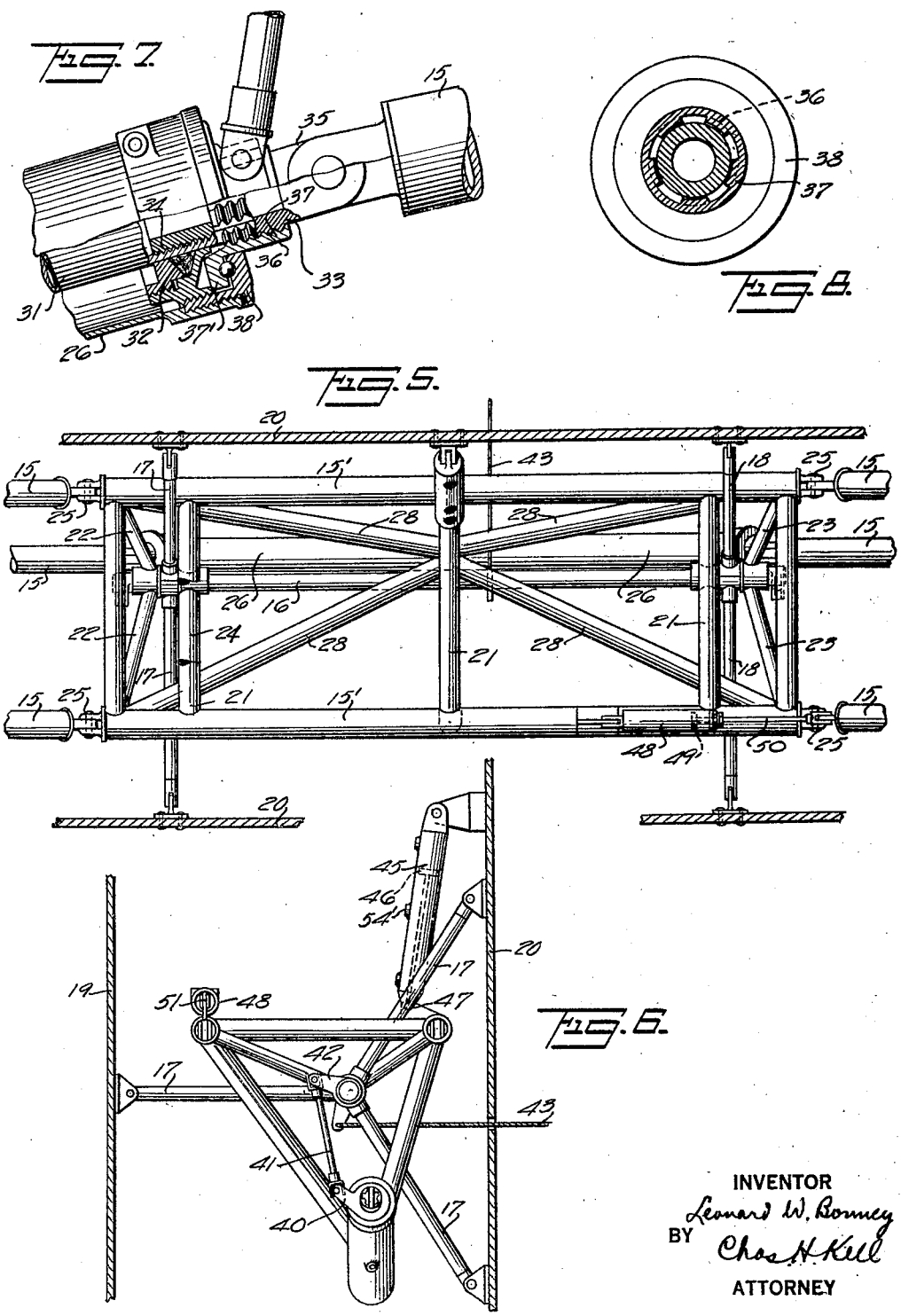

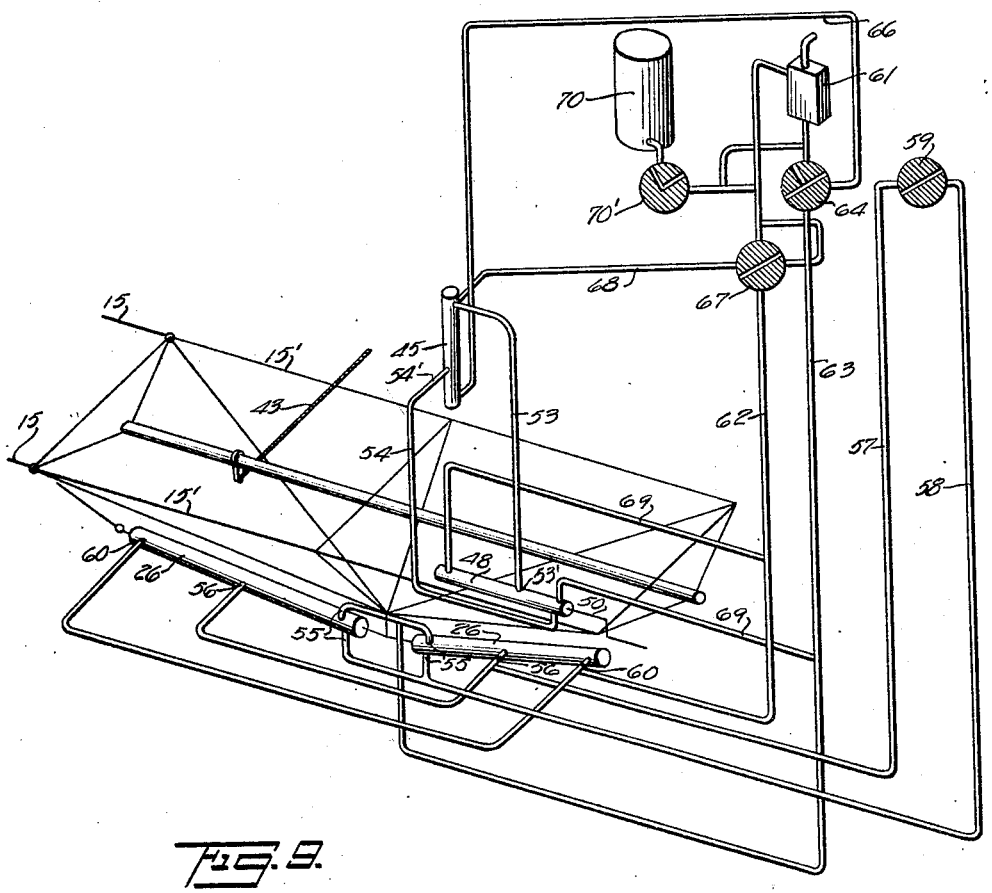

INVENTOR.
Leonard W. Bonney
BY Chas N Keil
ATTORNEYS.

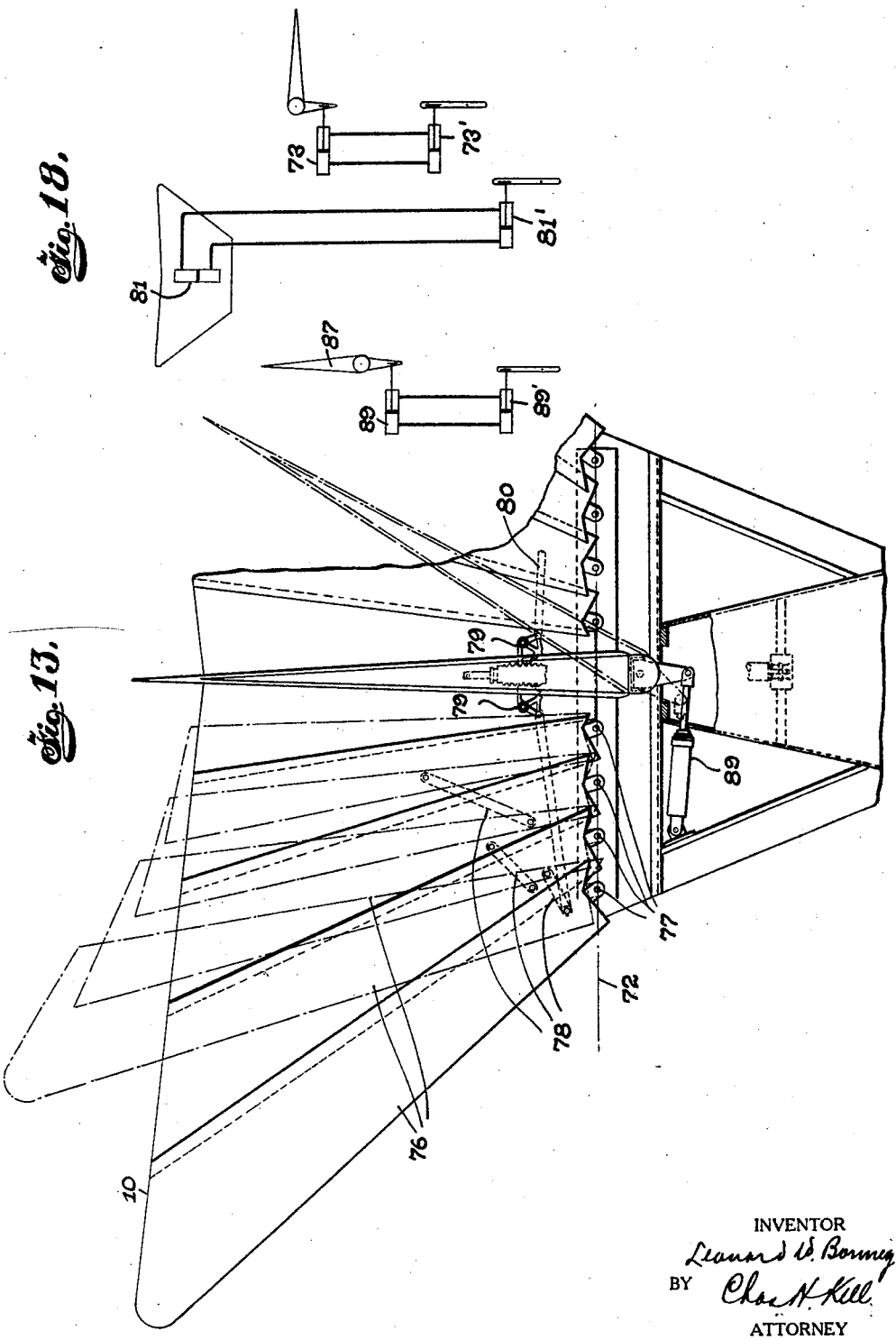

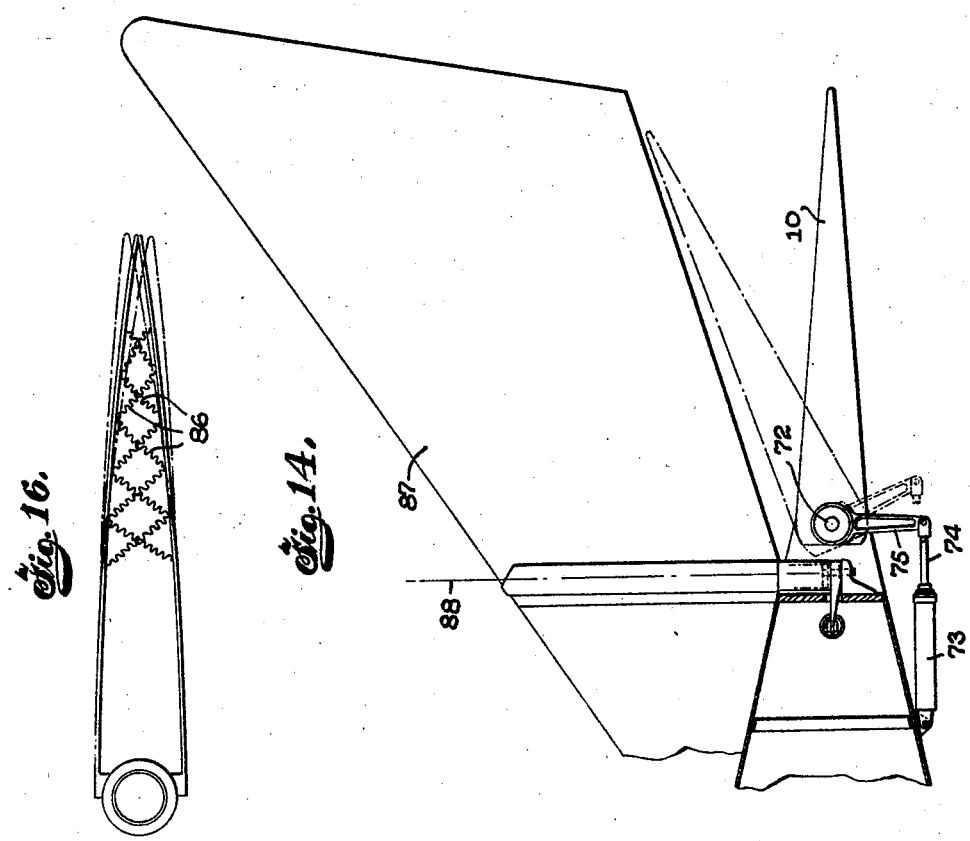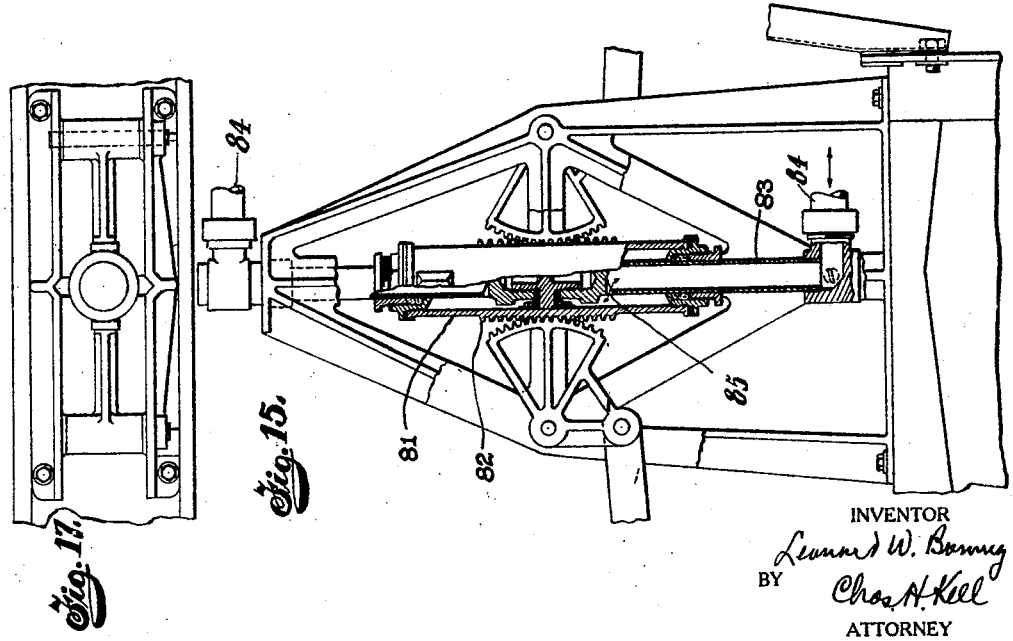

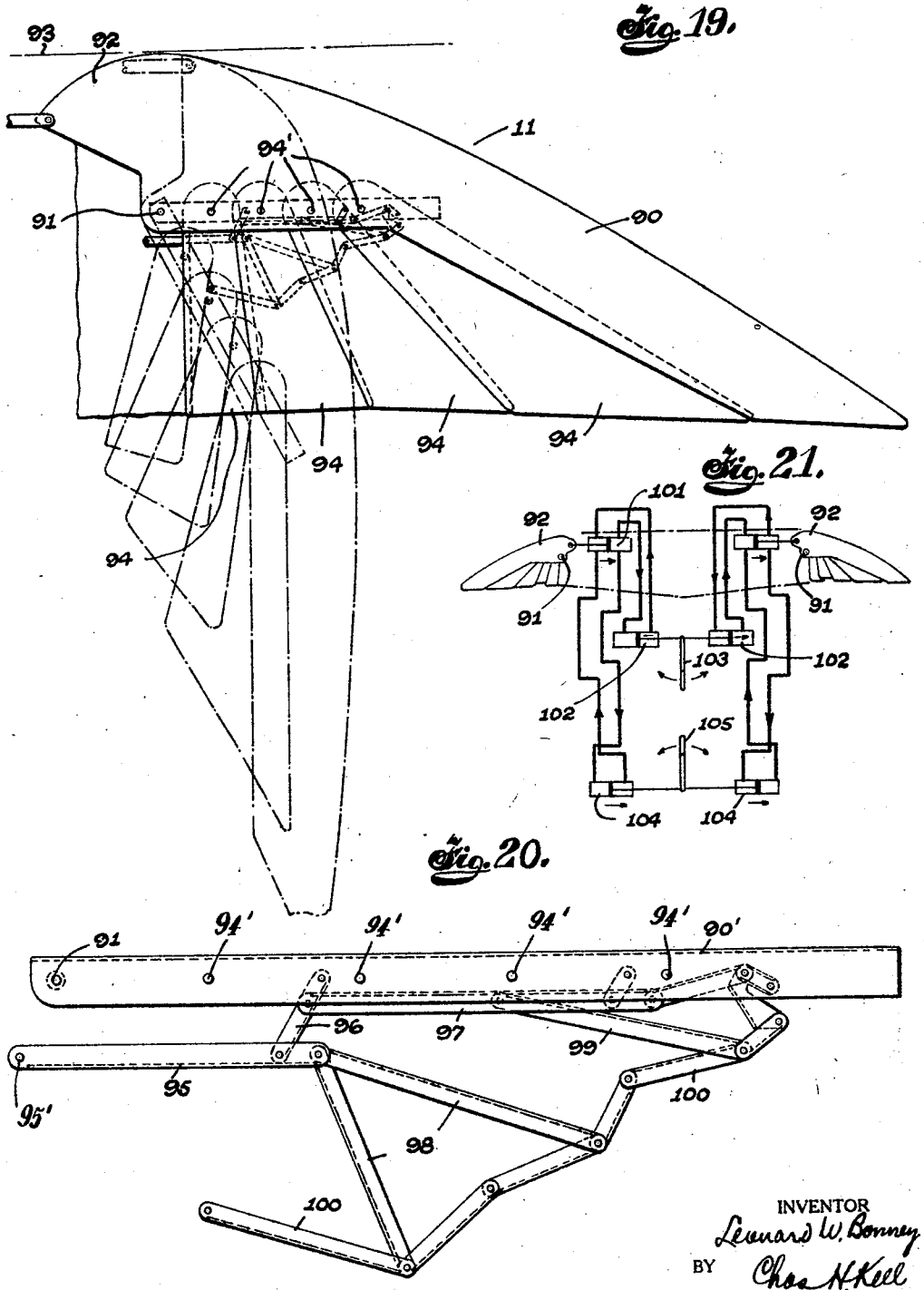

Patented Apr. 23, 1929.

1,710,670

UNITED STATES PATENT OFFICE.

LEONARD W. BONNEY, OF FLUSHING, NEW YORK; FLORA MacDONALD BONNEY EXECUTRIX OF SAID LEONARD W. BONNEY, DECEASED.

AEROPLANE.

Application filed November 9, 1925. Serial No. 67,720.

This invention relates to aircraft of the heavier-than-air gliding type.

The object of the invention generally is an aeroplane which is peculiarly characterized by the ease and readiness with which it may be controlled and maneuvered while in the air, by its ability to be safely landed or launched from the air within restricted places and generally by its even and smooth flying qualities free from the usual vibrations and pitching characteristics of many prior planes. To these ends I have devised an aircraft control and a wing structure and mechanism therefor of such character as to simulate in some respects the flying and perching or landing movements of birds. For example I have devised a novel aeroplane structure by which both the dihedral angle of the supporting wings and the angle of incidence thereof may be automatically governed and controlled at the instance of the pilot while in the air whereby upon landing or launching the craft from the air the pilot may, by setting the supporting wings at large dihedral and incidence angles, effect a quick and safe retarding and settling of the craft for landing into restricted spaces, thereby simulating somewhat the perching movements of a sea gull. Moreover, I have combined with such wing structure and mechanism a system of automatical and inherently flexible controls which contribute to the smooth soaring flight of the plane under the varying atmospheric conditions, such controls including flexible wing tips which are differentially variable to effect the lateral balance and whose surfaces are also variable in the same direction to vary the aspect ratio of the craft for different speeds. Such flexible controls also include a novel horizontal tail elevator or fin unit whose effective surface is variable and whose angle may be varied in the usual manner of elevator control, together with an inherent flexibility, all of which contribute to the safe control of the craft while in the air and while landing. My invention also includes a wing of novel flexible construction which automatically functions with the flexible controls to obtain the even, smooth and vibrationless flight and also to automatically accommodate the wing curvature to the relative air speed conditions.

Another object of my invention is a wing structure and mechanism of a character permitting the lifting of the wings to a substantially vertical position and the backward folding of the same along the fuselage and in proximity to the tail unit.

A further object of the invention is an aeroplane characterized by its safety and reliability in operation and by its endurance and ability to withstand rough usage under all service conditions, thereby rendering it particularly suitable for the commercial passenger traffic and sportsman's use. My novel craft is also of a character to be readily and economically manufactured and assembled, which may be readily repaired, and whose parts may be replaced with the greatest facility.

For a better understanding of my invention, reference may be had to the accompanying drawings forming a part of this application, wherein:

Fig. 1 is a plan view of an aeroplane embodying my invention,

Fig. 2 is a front view thereof,

Fig. 3 is a side view,

Fig. 4 is a skeleton view of a portion of the wing structure mechanism,

Fig. 5 is another view corresponding to Fig. 4,

Fig. 6 is a view at right angles to Figs. 4 and 5,

Figs. 7 and 8 are views of certain details of the mechanism,

Figure 10:
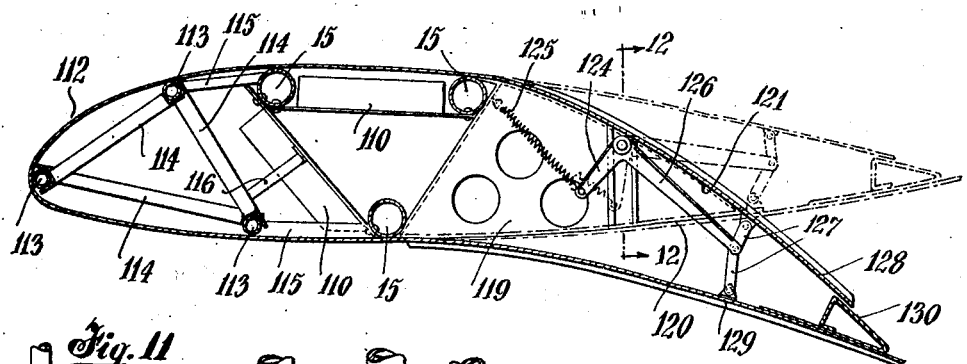
Figure 11:
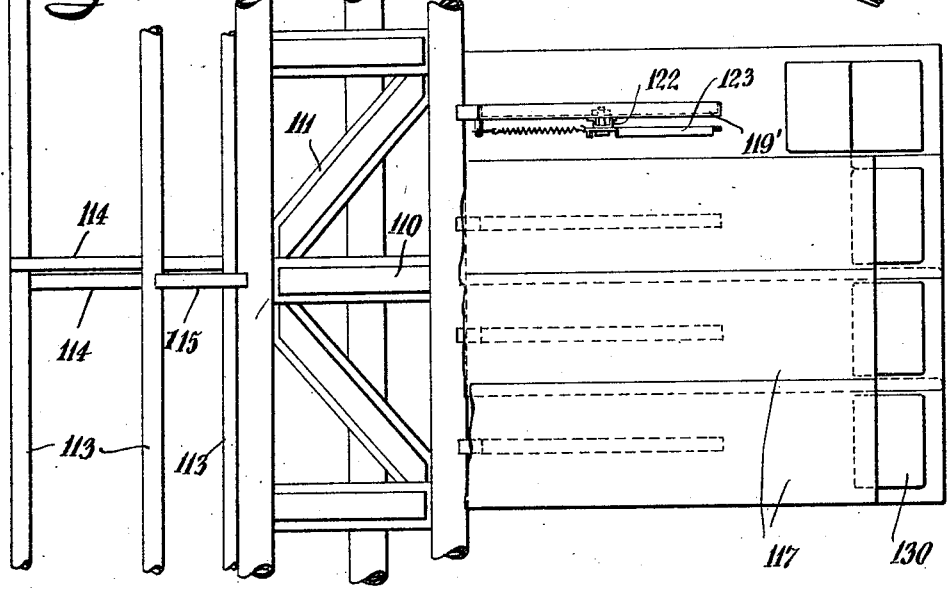
Figure 12:
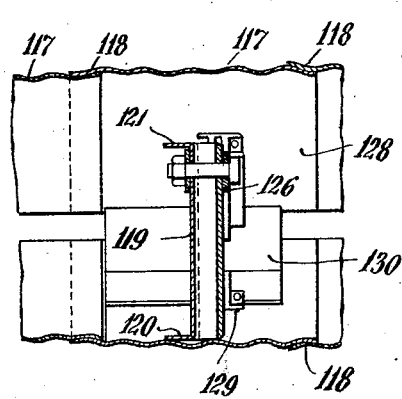

Fig. 9 is a diagrammatic view generally of the hydraulic control and actuating system for the wing mechanism, Fig. 10 is a section along the lines 10—10 of Fig. 1 showing the wing structure, Fig. 11 is a plan view of the wing structure, Fig. 12 is a sectional view of a part of the wing structure, Fig. 13 is a plan view of the tail structure, Fig. 14 is a side view thereof, Fig. 15 is a plan view of the elevator control mechanism, Fig. 16 is a diagrammatic view of one of the tail feathers, Fig. 17 is an end view corresponding to Fig. 16, Fig. 18 is a diagrammatic view of the control mechanism for the tail elements, Fig. 19 is a plan view of an aileron, Fig. 20 is a view of aileron feather connections, and Fig. 21 is a diagrammatic view illustrating the control of the aileron.

Referring to the drawings where similar reference numerals designate similar parts throughout, I have illustrated my invention as embodied in an aeroplane of the monoplane land type, but it will be obvious that my invention is not necessarily restricted to an aeroplane of either the monoplane type or the land type. The illustrated embodiment of my invention includes a monoplane with left and right hand wing sections 1 and 2 carrying a central main body 3. The latter contains at any suitable point the cockpit 4 for the pilot and passengers and carries at the front end any suitable motor 5 and propeller 6. A landing gear 7 is illustrated, being suitably attached underneath the main body. A tail skid 8 is indicated for protecting the tail unit of the plane in landing and while running along the ground.

The wing sections 1 and 2 while being of a continuous structure from tip to tip are capable of being automatically lifted to the full line positions shown in Fig. 2 to increase the dihedral angle to any degree desired, as for example, 45°, while at the same time these wing sections are capable of turning about axes approximately longitudinally of their length for increasing the angles of incidence thereof simultaneously with the increase of the dihedral angle. This operation and functioning of the wing sections 1 and 2 relatively to the fuselage 3 and the direction of travel are mainly for the purpose of effecting a quick and safe landing within restricted spaces. The illustrated embodiment of my invention also includes a special tail unit including a flexible, variable surface elevator 10 which cooperatively functions with the adjustable wing sections 1 and 2 for stabilizing the craft upon landing and also functions as an improved longitudinal control for the craft during flight. The embodiment herein exhibited also includes flexible variable surface wing tips 11 and 12, these tips being differentially variable for assisting in effecting the lateral stability control, and also variable in the same direction for the purpose of varying the aspect ratio of the plane to correspond to different operating speeds.

The wing structure is built up around a triangular spar which forms the backbone of the wing and consists of the three tubular members 15 suitably braced from each other (Figs. 4 and 10), the wing structure and the particular method of bracing being more specifically set forth hereinafter. The wing sections 1 and 2, as above indicated, are capable of combined variation in the dihedral angle and the angle of incidence, and in the particular embodiment illustrated this function is effected by pivoting each of the sections 1 and 2 to an intermediate wing frame structure for adjustments in the dihedral angle and mounting the intermediate wing frame structure for rotary movement about a horizontal axis transversely of the fuselage. This intermediate wing frame structure (Figs. 4-6) includes a transverse tubular support 16 which is horizontally suspended, transversely through the main body 3, by means of the two groups of star-arranged supports 17 and 18 which supports are fastened to the bulkheads 19 and 20 of the main body 3, the main central tubular support 16 being adapted to rotate in any suitable bearings carried by the adjacent ends of the groups of supports 17 and 18. The central frame structure, in the particular embodiment illustrated, includes a pair of tubular frame members 15' which are suitably braced by the tubular cross-members 21 and which are carried by the central tubular member 16 by means of the pairs of converging bracing members 22 and 23. The crosswise members 15' form, in effect, continuations of the two upper triangular spar members 15 of the wing frame, but pivotal connections are indicated at 25 between the wing sections 1 and 2 and the intermediate wing frame structure for permitting variation of the dihedral angle of the wings. Suspended beneath the frame members 15' is a pair of hydraulic cylinders 26, the inner adjacent ends of these cylinders being pivotally connected to the support 27 for pivotal adjustments corresponding to the pivotal connections of the wing sections 1 and 2. The support 27 is carried on the frame members 15' by means of two pairs of inwardly extending and converging bracing members 28 assisted by a pair of intermediate braces 29 extending downwardly from the frame members 15'. The hydraulic cylinders 26 contain the pistons 30 and piston rods 31 and the outer ends of these piston rods 31 are pivotally connected at 35 to the inner ends of the lower spar members 15 whereby under the influence of the hydraulic pressure operating against the pistons 30 in cylinders 26 the wing sections 1 and 2 are permitted or caused to assume varying dihedral angles. Each cylinder is provided with means for mechanically locking the piston rod 31 directly to the cylinder 26 so as to form a rigid connection for operation during normal flight. This mechanism is as follows: Each cylinder is provided with any suitable packing device 32 and each of the piston rods 31 is provided with a detachable plug 33 having on one end an externally screw-threaded portion 34 which is adapted to be screw-threadedly attached within a similarly threaded end of the tubular piston member 31 and having on its opposite end a pivotal connection 35 with the spar member 15. The connecting plug 33 is provided intermediate its ends with the mutilated external screw-threads 36, and an oscillatable sleeve 37 with similarly mutilated internal screw-threads is adapted to function with the plug 33 to lock the piston rod 31 and the lower spar member 15 directly to the cylinder 26. The sleeve 37 is mounted for rotary movement within the end of the cylinder 26 by means of a retaining unit 38 screw-threadedly attached to the inside of the cylinder 26 and having an annular flange cooperating with a similar annular flange 37' of the sleeve 37, a ball bearing being indicated for minimizing friction. Each rotary sleeve 37 is provided with a bell crank lever 40 which is connected by means of a connecting link 41 with a bell crank lever 42, the bell crank levers 42 being in turn connected with an operating sleeve or shaft for operation in unison by a manual control 43. By means of this manual control 43, the sleeves 37 may be rotated so as to bring their multilated screw-threads out of engagement with the mutilated screw-threads of the plugs 33, thereby disconnecting the rigid mechanical connections between the lower members 15 of the wing sections 1 and 2 and the respective cylinders 26 and putting into operation the cylinders 26 for the control and the increase of the dihedral angle up to the desired point for landing.

The mechanism whereby the pilot may increase the angle of incidence of the wings, in the particular embodiment shown this being effected automatically in response to the increase of dihedral angle, is as follows: A hydraulic cylinder 45 is pivotally suspended from the bulkhead 20, this cylinder having a piston 46 with a piston rod having a pivotal connection 47 with a frame member 15', by the actuation of which piston 46 the central frame work of the wing may be rotated about 16 as an axis. One of the frame members 15' carries on its upper side a hydraulic cylinder 48, this cylinder being pivotally mounted thereon at one end, the other end of this cylinder being free for pivotal movements in the vertical planes. This cylinder has a piston 49, together with a piston rod 50 which is pivotally connected at its outer end to an upwardly projecting lug 51, mounted on the inner end of one of the corresponding spar members 15. The upper end of the cylinder 45 has a hydraulic pressure communicating connection 53 (Fig. 9) leading to a point intermediate the ends of the cylinder 48. A similar pipe 54 leads from a point intermediate the ends of the cylinder 45 to the end of the cylinder 48. The circuit, including the cylinders 45 and 48 and the pipe connections 53 and 54, forms a closed circuit and is maintained full of a suitable liquid operating medium and when the wing sections 1 and 2 are lifted about the pivotal points 25, they actuate through the medium of the lug 51 and piston rod 50 the piston 49 of the cylinder 48, and the movement of the piston 49, by transferring the liquid from one side of the piston 46 to a point on the other side thereof causes the lowering of the piston 46 with its piston rod 47 and the consequent rotation of the central wing structure including the frame members 15' about 16 as an axis, and thereby causing an increase of the angle of incidence of the wing sections 1 and 2 simultaneously with the increase of the dihedral angle.

The adjustment of the dihedral angle and the angle of incidence of the wings may be varied to suit the particular requirements of the craft, and while in the particular embodiment shown the arrangement is such as to increase the dihedral angle to substantially 45° with the simultaneous increase of the angle of incidence to 20°–25°, yet it is understood that my invention is not restricted to any specific degrees of adjustments.

In Fig. 9 I have illustrated diagrammatically, with the omission of as much detail as possible for convenience in exposition, a system of hydraulic control and manipulation for effecting the simultaneous adjustments of the dihedral and the angle of incidence for landing and launching from the air. Each of the cylinders 26 is provided with a pair of intakes 55 and 56, the intakes 55 being utilized for the purpose of admitting hydraulic fluid pressure back of the pistons 30 to effect the lifting of the wing sections 1 and 2. The connections 56 are disposed intermediate the ends of the cylinders 26 and are for the purpose of permitting the by-pass of the hydraulic fluid from the front of the pistons 30 to the back sides thereof to effect the automatic increase of the dihedral angle upon the operation of the trip-lock mechanism, including the levers 41 and the sleeve 37. These intakes 55 and 56 have communicating connections 58 and 57 leading to the regulating or controlling valve 59 which may be disposed in the cockpit adjacent the pilot. The system, including the cylinders 26 and the pipe lines 57 and 58, is completely filled with hydraulic operating fluid and upon the opening of the valve 59 to the degree desired, a pull upon the piston rods 31 and the pistons 30 will cause a transfer of the fluid from the front side to the back side thereof through this by-pass connection, which transfer will continue until the pistons 30 pass the by-pass connection 56,—whereupon such operation ceases. This operation can only occur, however, after the tripping of the locking mechanism 41 and 37 which disengages the piston rod 31 from its mechanical locking operation with the cylinder 26. When, therefore, the craft is approaching the landing position desired, the pilot trips the locking mechanism whereupon the weight of the fuselage 3 and motor operating against the air pressure beneath the wing sections 1 and 2, causes the relative lifting of the wings and the fuselage to increase the dihedral angle, this increase being more or less gradual, depending upon the adjustment of the mechanism and the regulation effected by the valve 59. This increase in dihedral angle can be discontinued at any point by the closing of the valve 59, and at any event it is discontinued when the pistons 30 reach the connections 56. Simultaneously with the increase of the dihedral angle, as above indicated, the piston 49 of the cylinder 48 is caused to actuate the piston 46 in the cylinder 45 to increase the angle of incidence, the movement of piston 46 being arrested to retain the new angle of incidence only when the piston 46 reaches the connection 54' or the piston 49 reaches the connection 53'. The craft, therefore, upon landing will assume some such attitude as that indicated in Fig. 2 wherein by the combined gradual settling or dropping of the craft permitted by the gradual increase of the dihedral angle, and by the increased lifting and retarding action obtained by the simultaneous increase in the angle of incidence, the craft may be landed or launched in quite restricted spaces. The combined lifting of the wing sections 1 and 2 and the rotation of the central wing support also result in an increase of the sweep back of the wing sections 1 and 2. Moreover, the flexible wing construction and controls including the variable surface elevator or fin 10 and the wing tips 11 and 12 cooperate with the simultaneous adjustment of the dihedral angle and the angle of incidence to effect a safe and reliable landing under the most difficult flying conditions. For example, upon approaching the landing position, the pilot may increase the surfaces of the wing tips 11 and 12 to the maximum and also the surface of the elevator 10 simultaneously with the increase of the dihedral and incidence angles,—all of which adjustments cooperate to enhance the stability at landing.

While I have indicated diagrammatically the hydraulic control system permitting the automatic increase of the dihedral angle, I may provide positive actuating means for this purpose acting alone or in cooperation with the automatic means. For this purpose each of the cylinders 26 is provided with a connection 60 near its outer end and a gear pump 61 conveniently located with reference to the pilot is provided for transferring the fluid from one side or the other of the pistons 30, this gear pump having communicating lines 62 and 63 leading respectively to the connections 60 and 55 disposed at the opposite ends of the cylinders 26. A two-way valve 64 is disposed in the line 63 for closing such communication.

In the particular embodiment of my invention herein illustrated, the above mechanism for adjusting the dihedral and incidence angles may be utilized for folding the wings back against the fuselage as indicated in Figs. 1 and 2. For example, after the craft has landed with the wing sections 1 and 2 in some such position as indicated in Fig. 2, these wings may be still further lifted to an approximately vertical position by setting the valve 64 to connect the gear pump 61 with the line 63, whereupon by operating the gear pump 61 the pistons 30 and piston rods 31 may be caused to continue the traverse of the cylinders 26 until the wing sections 1 and 2 are approximately vertical. When this position is reached the valve 64 may then be turned to its other position, disconnecting the gear pump 61 with the line 63 and connecting it with line 66 which leads to the lower end of the cylinder 45, and at the same time turning the one-way valve 67 so as to connect the line 62 with the line 68 leading to the upper end of the cylinder 45. With the valves in this position, the gear pump 61 may be operated to transfer the liquid from the lower end of the cylinder 46 to the upper end thereof, and thereby cause the rotation of the central wing supporting structure about the axis 16 to bring the wing sections 1 and 2 from the substantially vertical position to a position down approximately parallel with the fuselage. With the wings folded in this position the craft can be stored in the most restricted spaces. The wing sections 1 and 2 may be again brought to normal flying position by following the above operations in reverse order, namely by first connecting the gear pump 61 with the cylinder 45 by means of the valves 64 and 67 and operating the gear pump 61 in a direction to shift the fluid from the upper side of the piston 46 to the under side thereof until the wings are lifted to the vertical position, and then by disconnecting the valve 67 and shifting the valve 64 to the other position and operating the gear pump 61 in the required direction, the wings may be brought to the normal operating position. At 70 I have indicated diagrammatically a reserve oil or fluid tank which with the controlling valve 70' serves for filling all cylinders and compensating for leakages in the lines. At 69 I have indicated a pair of communicating lines leading from the lines 62 and 63 from the opposite ends of the cylinder 48. These connections 69 permit the shifting of the fluid from one side of the piston 49 to the other, while the cylinders 26 are being utilized to operate the wings between the vertical and the flying positions.

In Figs. 13–18 I have illustrated the tail unit of my novel aeroplane including the variable surface horizontal fin or elevator 10 for cooperation and functioning with the adjustment of the wing sections 1 and 2 for landing. The elevator 10 is mounted for pivotal movements about a horizontal axis 72 and may be operated in any suitable manner, preferably by the hydraulic cylinder 73 having its piston rod 74 pivotally attached to a bell crank lever 75 fixed in any suitable manner to the elevator, one end of the hydraulic cylinder 73 being pivotally attached in any suitable manner to the fuselage or frame work. The elevator 10 includes a multiplicity of feather or fan blade like members 76 (diagrammatically illustrated) which are pivotally attached to the elevator support at the points 77 for adjustable movements in planes parallel with the axis 72. The feather or blade members 76 may be extended as illustrated in full lines, to increase the horizontal tail surface and elevator control, or may be closed up, somewhat similar to a fan, to the position indicated in dotted lines. They are connected together by a system of pivoted link connections 78 to provide a simultaneous shutting and opening movement thereof, the arrangement being such that the feather like members 76 have an increasingly larger movement from the innermost to the outermost feathers. The actuation of these feathers may be effected in any suitable manner and in the particular embodiment shown I have indicated generally a pair of segmental gears 79 with link connections 80 pivotally connected to these gears at one end, and to the outermost feather like member 76 at the other ends. The segmental gears 79 mesh with racks carried by a cylinder 81, the latter being carried by a fixed piston 82 and fixed hollow piston rod 83, whereby upon admission of hydraulic operating fluid to either side of the piston 82 and the simultaneous withdrawal from the other side, the cylinder 81 with the racks engaging the segmental gears may be moved back and forth to control the closing and opening of the fan like feather members 76. Preferably the feather members 76 are of flexible character to give and yield in response to the controlling movements so as to smooth out the longitudinal control. Such flexibility may be secured by making them of a metal or other material having the required flexibility and resiliency or the flexibility of the feathers may be increased by a special construction, such for example as that diagrammatically indicated in Fig. 16, wherein the members 76 for a portion of their length from the tips are provided with an internal system of springs 86 for permitting the elevator to yield in either direction in response to undue pressures exerted thereupon but insuring the return of the elevator to its normal aerofoil curvature. At 87 I have indicated generally a rudder pivotally mounted on a vertical axis 88 for movements thereabout for effecting the usual controlling and steering movements in cooperation with the other controls. This rudder may be also hydraulically controlled as for example by the cylinder 89 having its piston rod suitably connected with the rudder to effect movements. The rudder 87 may also be of the flexible construction indicated for the elevator. In Fig. 18 I have illustrated diagrammatically the various controls for the tail unit wherein the hydraulic cylinders 73, 81 and 89 are controlled respectively by the manual control cylinders 73', 81' and 89', suitable hand control levers being connected with the latter cylinders and suitable communicating connections being disposed between the cylinders.

By means of a tail unit shown, not only may it be operated about its horizontal axis to effect the levelling out of the plane when approaching the point of landing, but also the effective controlling and tail surface is capable of being enlarged to a substantial extent in conjunction with the above described substantial increase of the dihedral angle and angle of incidence of the wing sections 1 and 2, whereby the stability and safety of the craft in landing are substantially enhanced and the landing or launching in restricted spaces facilitated.

In Figs. 19–20 I have indicated diagrammatically the reefing mechanism of the extensible and contractible wing tips 11 and 12. Each wing tip in the particular embodiment illustrated includes an elongated feather 90 which is pivoted at 91 to the wing structure, the root of such feather being in the form of or attached to a sector 92 which forms a continuation of the leading edge 93 of the wing in any adjusted position of the feathers. There are a plurality of auxiliary feathers 94 which are pivoted to the main feather 90 at the points 94' for pivotal movements relatively thereto. The feathers or blade-like members 90 and 94 may be extended as is shown in full lines to increase the wing surface, or they may be turned down to the position indicated in dotted lines to decrease the wing surface for higher speed operating conditions, or they may assume any intermediate point between the dotted positions and the full line positions indicated. The fan-like blades or feather members are linked together by the linkage system 95—100 so as to effect a gradual decreasing pivotal movement of the feathers from the outermost to the innermost wings, the link 95 being pivotally fixed to the wing frame at 95' and being parallel to the line of pivotal connections 94'. These feathers or blade members 90 and 94 are preferably flexible so as to yield in the vertical direction in response to undue pressures exerted thereupon, and such flexibility may be secured, at least in part, by utilizing flexible material such for example as flexible metal. Added flexibility may be secured by special internal construction, such for example as the internal spring construction and mechanism of Figs. 10-12 hereinafter described, the details of such construction being omitted for convenience in illustration. An indicated in Fig. 1, and as described above, these wing tips 11 and 12 may be differentially operated to effect lateral control or may be operated in the same direction to vary the aspect ratio of the craft. For example, at extreme slow speed both tips 11 and 12 would be extended to the approximate position indicated in full lines, while for higher speed operations the feather or blade-like members 90 and 94 can be closed up by the pilot during flight to correspond to a higher speed operating characteristic. The pilot may vary the surfaces to any desired degree, and within the limits of the design such adjustments of the wing tips in the same direction to vary the aspect ratio do not interfere with the inverse or differential operation of the tips for lateral balance. I have indicated diagrammatically in Fig. 21 an outline of the main circuits of a hydraulic system for effecting the lateral balance and changing the aspect ratio. The sectors 92 are operated about their pivots 91 by means of the hydraulic cylinders 101. With these cylinders 101 there is connected a pair of hand control cylinders 102 together with a hand lever 103 for simultaneously actuating the pistons of the cylinders 101. By shifting the lever 103 in one direction or the other, the pilot simultaneously extends the wing tip on one side and closes it on the other for the purpose of correcting the lateral balance. For varying the aspect ratio or simultaneously extending or closing up the wing tips, I have illustrated diagrammatically a pair of cylinders 104 whose pistons are simultaneously operated by a hand lever 105, whereby the pilot may, during normal flight, extend or close the wing tips to the degree desired. Upon landing or launching where it is desirable to have the lifting surfaces as large as possible, ordinarily the wing tips 11 and 12 would be extended to their full maximum surface within the range of controllability for lateral control.

In Figs. 10 to 12 inclusive I have illustrated a flexible trailing edge aerofoil construction which may be used for the main supporting wing and if desired also for the horizontal tail surface and the aileron surfaces. The triangular wing spar construction, consisting of the three tubular members 15 and the bracing members 110 and 111 connecting these tubular members 15, forms the main supporting element for the wing frame, this spar being substantially centrally disposed between the leading and trailing edges of the wing. The nose 112 is carried by a frame consisting of the longitudinal tubular members 113 which are braced between themselves by the bracing members 114 and this frame is supported from the main central spar by the upper and lower bracing members 115 and the diagonal members 116. The rigid part of the wing consists of the central spar member and the forward nose frame member. The remaining portion or trailing part of the wing is of a flexible character to compensate for varying speed and flying conditions and consists in the preferred embodiment of a plurality of individual feathers 117 whose upper and lower covering surfaces are preferably of metal and are provided with corrugations longitudinal of the feathers indicated in Fig. 12, these surfaces overlapping, as indicated at 118, to form continuous upper and lower surfaces. Each feather is carried by a form or bulkhead member 119 extending longitudinally thereof, this form member being rigidly attached in any suitable manner to the central spar structure of the wing and having a lower surface or supporting edge 120 corresponding to the lower surface of the aerofoil in the high speed position of the trailing edge of the wing. It also has an upper surface or supporting edge 121 corresponding to the upper surface of the trailing edge of the wing when the trailing edge is in its lowermost position for slow speed conditions. Each of these bulkheads 119 may be formed of web construction with suitable turned-over flanges 119′ to serve as supporting surfaces for the feather covering. Each bulkhead also carries a bracket 122 upon which is pivoted for adjustments in planes at right angles to the wing a bell crank lever 123, one end 124 thereof being normally biased in one direction by a spring 125 which is attached to the central spar construction of the wing and the other end 126 of the bell crank lever being attached by the pivoted links 127 to the upper and lower coverings 128 and 129 respectively of each feather. The upper covering 128 has its trailing edge free to adjust itself on a triangular box-frame 130 carried at the extreme edge of the lower covering 129 so as to facilitate adjustments. With this construction of the trailing edge, the feathers 117 are free to flex up and down, the full line position of Fig. 10 representing the slowest speed position, while the dash-and-dot position represents the full or maximum speed position. For example, by means of the mechanism including the bell crank lever 123 and the biasing springs 125, each feather is normally held in its lowermost position, but with increases of speed or of lift pressure upon the trailing portion of the wing, these mechanisms permit the elevation of the trailing portion of the wing, the elevation depending upon the pressure exerted, while the supporting member 119 serves as a positive stop for the upper and lower limits of the flexible adjustments. It is possible, therefore, in this construction, for the trailing portion of the wing to float between the upper and lowermost limits indicated during normal flight, the plane inherently compensating for the varying flying conditions. This flexible and compensating wing construction also cooperates with the adjustable wings, the flexible and extensible wing tips and the extensible and flexible elevator surface to obtain the maximum of smoothness and evenness of control, maneuverability and actual flying.

Having thus described my invention, what I claim and desire to protect by Letters Patent is:

1. In an aeroplane of the heavier-than-air gliding type a wing support structure which is continuous from tip to tip and rotatably carried about a central support whereby the angle of incidence of the wing may be varied at will, the end portions of said wing structure being also adjustable with reference to the central portion for variations in the dihedral angle and mechanisms under the control of the pilot whereby both the angle of incidence and the dihedral angle may be substantially increased at the same time.

2. In an aeroplane of the heavier-than-air type, a main central supporting frame work, wing sections carried on opposite sides of the main central support and simultaneously adjustable with reference thereto to a predetermined definite dihedral angle, a mechanism for effecting the gradual increase of the dihedral angle of the adjustable wing portions to said predetermined angle and a tripping mechanism under the control of the pilot for setting the first named mechanism into operation, the wing sections being also adjustable about axes approximately in the direction of their length for increasing the angle of incidence simultaneously with the increasing of the dihedral angle.

3. An aeroplane of the heavier-than-air gliding type including a wing which is adjustable during normal flight as to both its angle of incidence and its dihedral angle, and mechanism under the control of the pilot for simultaneously increasing both the dihedral angle and the angle of incidence to a substantial degree and sufficiently to enable the landing in restricted spaces.

4. An aeroplane of the heavier-than-air type including a wing which during normal flight is fixed in a definite flying attitude with respect to the other parts of the craft, but having an adjusting mechanism whereby the pilot may simultaneously increase both the dihedral angle and the angle of incidence of the wing to a sufficient degree to facilitate the landing or launching of the plane in restricted places.

5. An aeroplane of the heavier-than-air type including a wing which is capable of being locked in a definite flying attitude during normal flight, but also capable of being locked in a different attitude with a substantially larger angle of incidence and dihedral angle than in the normal flying attitude for facilitating the landing or launching of the craft in restricted places, together with mechanism under the control of the pilot for effecting the adjustments during flight.

6. In an aeroplane of the heavier-than-air type a main central supporting frame work, wing sections carried on the opposite sides thereof and capable of being locked at a definite flying attitude for normal flight, said wing sections being capable of occupying another position with a dihedral angle of substantially 45° and an angle of incidence substantially larger than the normal flying angle of incidence, mechanism for automatically changing said wing sections from one position to the other during flight and mechanism under the control of the pilot for regulating and governing said automatic adjustments.

7. In an aeroplane of the heavier-than-air type a main central supporting frame work and wing supporting structure rotatably carried thereby for rotation about a horizontal axis transverse to the line of flight, a pair of wing sections carried on the opposite sides of said wing supporting structure and pivotally connected thereto for adjustments to vary the dihedral angle thereof, a hydraulic controlling and operating mechanism interposed between the pivoted wing sections and the rotary supporting wing frame, means for mechanically locking the pivoted wing sections into a fixed position independently of the hydraulic control and operating mechanism, and a tripping mechanism for unlocking the mechanical holding means, said hydraulic operating mechanism permitting the wing sections to lift about their pivotal points until a substantial increase in dihedral angle thereof is effected.

8. In an aeroplane of the character set forth in claim 7 wherein there is included a hydraulic mechanism for rotating the central wing frame support about the horizontal axis for changing the angle of incidence simultaneously with the adjustment of the dihedral angle.

9. An aeroplane of the character set forth in claim 3 wherein the horizontal tail or elevator surface may be increased simultaneously with the dihedral angle and angle of incidence of the wings.

10. An aeroplane of the character set forth in claim 3 wherein the wing areas are extensible so as to increase the lifting surface thereof simultaneously with the increase of the dihedral angle and the angle of incidence.

11. In an aeroplane of the heavier-than-air type a wing capable of variations in its angle of incidence and an extensible horizontal tail or elevator surface, and mechanisms whereby the angle of incidence and the tail surface may be varied simultaneously while in the air either in the same direction or oppositely.

12. An aeroplane of the character set forth in claim 11 wherein the dihedral angle of the wings is also variable simultaneously with the other variations while in the air.

13. In an aeroplane of the character set forth in claim 11 wherein the wing surfaces are also variable simultaneously with the angle of incidence and the tail surfaces while in the air.

14. An aeroplane of the character set forth in claim 3 in which the sweepback of the wings is variable simultaneously with the adjustments of the angle of incidence and the dihedral angle while in the air.

15. An aeroplane of the heavier-than-air gliding type including a wing whose dihedral angle, angle of incidence, sweepback, and effective surface are variable, a horizontal tail surface which is also variable, and mechanisms under the control of the pilot for simultaneously adjusting said variable parts while in the air.

16. An aeroplane of the character set forth in claim 15 wherein the horizontal tail or elevator surface and the lifting wing are flexible to automatically compensate for varying flying conditions.

17. In an aeroplane of the heavier-than-air type, a pair of wing sections on opposite sides of the main body thereof which are adapted to be lifted in approximately vertical planes transverse to the line of flight to substantial dihedral angles for normal flying and also to approximately vertical positions and then moved in vertical planes parallel to the line of flight through 90° so as to lie close to the main body when not in flight.

18. An aeroplane of the character set forth in claim 17 including a wing supporting frame rotatably carried about a horizontal axis transverse to the fuselage, to which the wing sections are pivotally attached for movements in vertical planes to substantial dihedral angles for normal flying and also to substantially vertical positions and a mechanism whereby the pivoted wing sections may be lifted to the vertical and the supporting frame work rotated 90° with the wing sections parallel and lying close to the fuselage when not in flight.

19. An aeroplane of the heavier-than-air gliding type including wings which are adjustable during normal flight as to both their angle of incidence and their dihedral angle and whose areas are extensible so as to increase the lifting surface thereof and mechanisms under the control of the pilot whereby he may vary the dihedral angle and the angle of incidence to a substantial degree and sufficiently to enable the landing in restricted spaces and whereby, at the same time, the pilot may vary the wing area.

20. An aeroplane of the heavier-than-air gliding type including wings which are adjustable during normal flight as to their angle of incidence and are also operable to positions in fore and aft directions substantially parallel to the line of flight, and a mechanism under the control of the pilot for varying the angle of incidence to a substantial degree during normal flight and another mechanism for adjusting the wings to the fore and aft positions parallel to the line of flight.

In testimony whereof, I have signed my name to this specification.

LEONARD W. BONNEY.